(No Model.) 2 Sheets—Sheet 1.

A. A. SPADONE.
ATTACHMENT FOR HOSE REELS.

No. 534,764. Patented Feb. 26, 1895.

WITNESSES:
Katie Gross.
Lena Gross.

INVENTOR
ALFRED A. SPADONE,
by Oscar A. Michel & Co. ATT'YS.

(No Model.) 2 Sheets—Sheet 2.
A. A. SPADONE.
ATTACHMENT FOR HOSE REELS.

No. 534,764. Patented Feb. 26, 1895.

WITNESSES: Katie Gross. Lena Gross.

INVENTOR: ALFRED A. SPADONE,
by Oscar A. Michel & Co. ATT'YS.

United States Patent Office.

ALFRED A. SPADONE, OF NEW YORK, ASSIGNOR OF ONE-HALF TO WALTER W. SPADONE, OF BROOKLYN, NEW YORK.

ATTACHMENT FOR HOSE-REELS.

SPECIFICATION forming part of Letters Patent No. 534,764, dated February 26, 1895.

Application filed November 13, 1894. Serial No. 528,618. (No model.)

*To all whom it may concern:*

Be it known that I, ALFRED A. SPADONE, a citizen of the United States, residing at New York, in the county of New York and State of New York, have invented certain new and useful Improvements in Attachments for Hose-Reels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new and useful improvement in hose-reels and it consists in the combination with said hose-reels and in the combination and arrangements of parts substantially as will be hereinafter set forth and claimed.

The object of my invention is to secure a hose-reel that by unwinding the hose from the reel or by turning the revolving pipe the flow of water will immediately pass through part of the axle or revolving pipe and through the hose and to stop the flow of water it is necessary to turn the revolving pipe or to wind the hose upon the reel frame, the further object being that the hose will be ready for instant use by having the valve head secured to the water main by proper hose connection and the water always remaining around said pipe forming part of the axle.

The invention is illustrated in the accompanying drawings in which like letters of reference indicate corresponding parts in each of the several figures.

Figure 1:
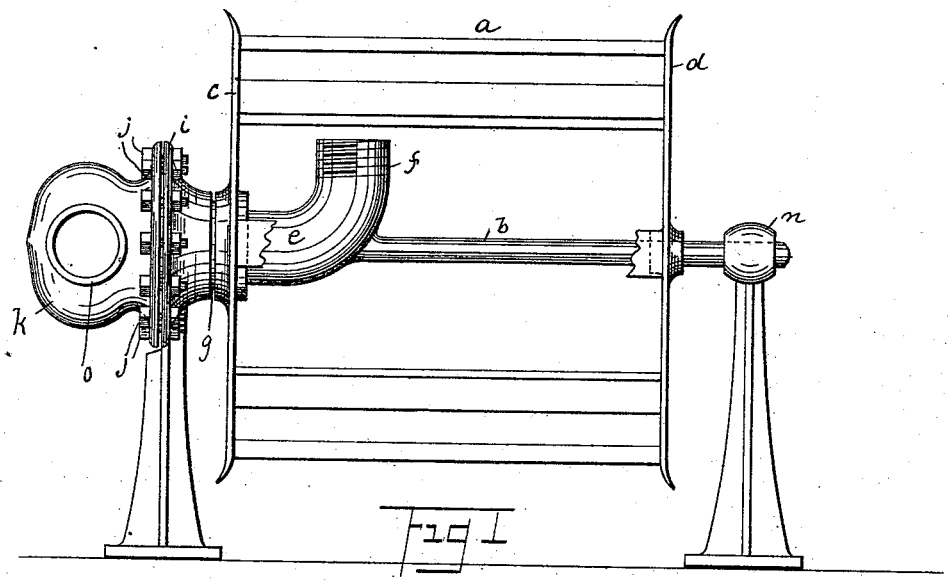
Figure 2:
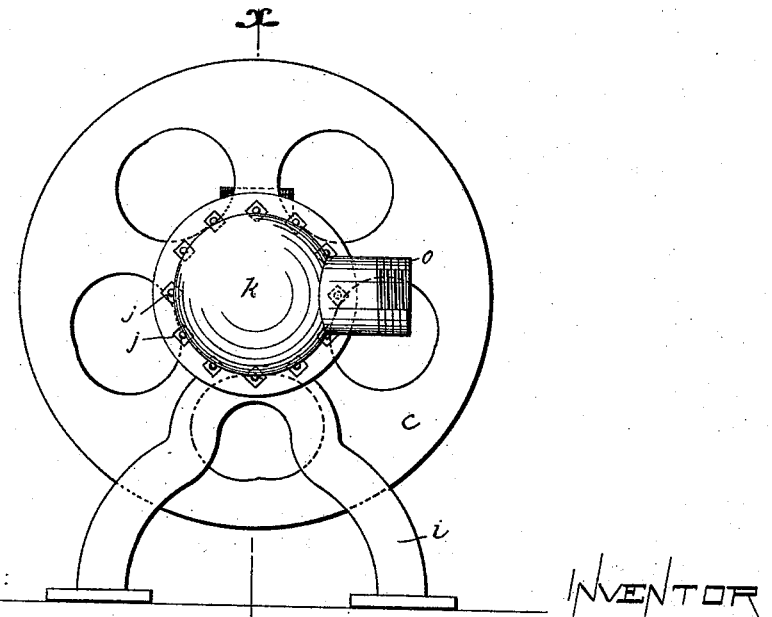
Figure 3:
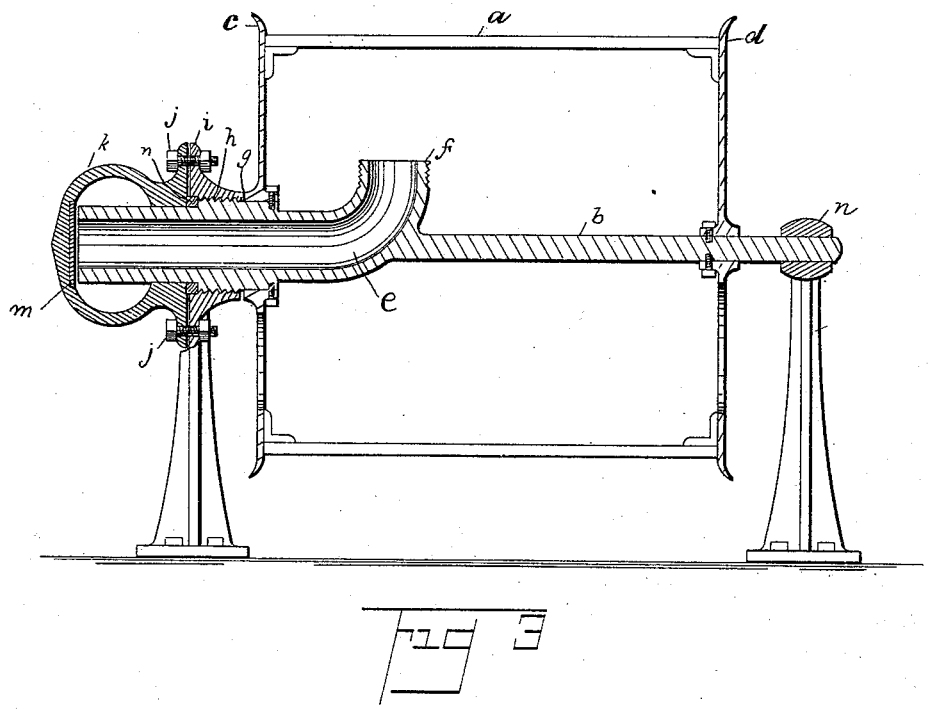

Figure 1 is a front elevation of an ordinary hose-reel with my improvement attached thereto. Fig. 2 is an end elevation of Fig. 1, and Fig. 3 is a section on the line $x$—$x$ of Fig. 2.

In said drawings $a$ represents the skeleton of an ordinary hose-reel frame and having an axle $b$ passing through and having the ends $c$ and $d$ of the reel frame secured to the axle. At one end of the axle $b$ is formed integral with said axle a pipe $e$ running to about the center of the reel and having a turned up edge $f$ to which is secured the end of the hose, which is not shown on the drawings. On this pipe $e$ is formed a shoulder $g$ having a screw thread $h$ to engage with the screw thread on the inside of the stationary upright or bearing $i$. To this stationary bearing or upright $i$ is secured by bolts or screw $j$ the valve head $k$ having a valve seat $m$ for closing the mouth of the pipe $e$ when the said reel is not in use. Between the upright or bearing $i$ and the valve head $k$ is placed a packing $n$ to prevent any leakage from the valve head containing the water. To this valve head is secured a pipe $o$ for connecting said valve head with the water main. The other end of said axle $b$ after passing through the end $d$ of the reel $a$ rests in upright or bearing $n$. The distance from the end $d$ of the reel and the inner side of the stationary upright or bearing $n$ is so arranged that by unwinding the hose from the reel the axle will not become disengaged from the upright or bearing $i$ as will be clearly understood upon referring to Fig. 3 of the drawings.

In operating my invention I secure the valve head to the water main by proper connection of pipes, so that the said valve head will always be filled with water, and having the hose fastened to the turned up end of the pipe $e$, and wound around the reel frame, so that said reel containing the hose will be near to the stationary upright or bearing $i$ and in this condition the reel is ready to be used at once by unwinding the hose from the reel. The axle with the pipe $e$ having the screw thread $h$ will rotate with the reel and thereby disengage the end of the pipe from the valve seat and this can be done until the end $d$ of the reel frame will be near to the inner side of the stationary upright or bearing $n$ as will be understood.

To stop the flow of water through the hose it is only necessary to wind the hose upon the reel again which will draw the axle toward the valve seat by the action of the screw thread upon the axle and the stationary upright or bearing $i$.

I do not wish to be understood as limiting myself to the exact construction shown as various changes can be made without departing from the spirit of my invention.

What I claim as new, and desire to secure by Letters Patent of the United States, is—

1. In a hose-reel, the combination of a revolving reel permanently connected to the axle, a pipe cast to said axle, stationary uprights or bearings through which the said axle and pipe pass, and a valve head secured to one of said stationary uprights or bearings, and adapted to be engaged by said pipe as and for the purposes set forth.

2. In a hose-reel the combination of stationary uprights or bearings, valve head secured to one of said stationary uprights or bearings, a pipe passing through said stationary upright or bearing and entering into said valve head, the other end of said pipe passing through the hose-reel and having a turned up edge for connecting the hose to the pipe, an axle connected permanently to said pipe, substantially as set forth.

3. In a hose-reel, the combination of a stationary upright or bearing, valve head secured to said stationary upright or bearing, an axle passing through said reel and having a pipe cast integral with said axle, one end of said pipe passing through the stationary upright or bearing and entering said valve head and resting against the valve seat when closed, the other end of said pipe passing through the end of said reel and having a turned up edge for fastening the hose, said ends of the reel being fastened to said axle, substantially as set forth.

4. In a hose-reel, the combination of stationary uprights or bearings, a valve head secured to one of said stationary uprights or bearings, an axle passing through said reel and having a pipe cast integral with said axle, one end of said pipe passing through the stationary upright or bearing, and entering said valve head, said pipe having screw threads engaging with the stationary upright or bearing, for opening and closing said valve the other end of said pipe having turned up edge for connecting said pipe to the hose, an opening in said valve head to connect with the water main, substantially as set forth.

5. In a new article of manufacture the combination of a rotating pipe secured to a stationary bearing, a valve head secured to said stationary bearing, said pipe passing through said stationary bearing and entering into said valve head, pipe connection connecting the said valve head to the water main, substantially as set forth.

In testimony that I claim the invention set forth above I have hereunto set my hand this 8th day of November, 1894.

ALFRED A. SPADONE.

Witnesses:
OSCAR A. MICHEL,
AUGUST GROSS.